United States Patent Office 3,562,194
Patented Feb. 9, 1971

3,562,194
OIL-MODIFIED ALKYD RESIN THIXOTROPIC PAINT AND PROCESS FOR THE PREPARATION THEREOF
Wilhelm Offermann, Dusseldorf, and Heinz Linden and Jurgen Plapper, Dusseldorf-Holthausen, Germany, assignors to Henkel & Cie G.m.b.H., Dusseldorf-Holthausen, Germany, a corporation of Germany
No Drawing. Filed Feb. 17, 1969, Ser. No. 799,980
Claims priority, application Germany, Feb. 17, 1968,
P 16 44 836.5
Int. Cl. C09d 3/64, 5/04
U.S. Cl. 260—22                                  13 Claims

ABSTRACT OF THE DISCLOSURE

Thixotropic oil-based paint containing from 0.1 to 3% by weight, based on the finished paint, of an additive which is a salt of a reaction product of a polyvalent inorganic acid such as sulfuric, phosphoric, or boric, and an ester defined as follows:
(a) an ester of low epoxide oxygen content of an unsaturated aliphatic carboxylic fatty acid and a saturated alcohol, or
(b) an ester of low epoxide content of an unsaturated fatty alcohol and a carboxylic acid.
The process for preparation of the thixotropic paint is accomplished by admixing the additive with an oil-based paint.

PRIOR ART

In the past, thixotropic paints were generally made by incorporating the products which make them thixotropic, such as polyamide resins containing amino groups, in the corresponding vehicle components before grinding with the pigments. A further correction of the thixotropic property of the finished paint was not possible with these products.

Although auxiliary thixotropic agents which can be added to the finished paint are known at present, their action is linked with the presence of active pigments, such as zinc oxide or zinc white, in the paint. The paints mixed with these active pigments have the disadvantage that their thixotropic property constantly alters and may entirely disappear or lead to thickening, depending upon the circumstances.

OBJECTS OF THE INVENTION

An object of the present invention is the development of thixotropic paints which lack the disadvantages of the prior art paints and which may be prepared by adjustment of the thixotropic characteristic of the finished paint.

Another object of the invention is the preparation by thixotropic paints which do not exhibit settling of the pigments after prolonged storage periods.

A further object is the discovery of thixotropic paints which counteract flooding phenomenon.

A still further object of the invention is the improvement and acceleration of the grinding operation of the various paint components by incorporation of the herein described paint additive.

An additional object of the invention is the use of a reduced amount of the herein described paint additive by incorporation of certain active pigments into the paint composition.

DESCRIPTION OF THE INVENTION

The present invention relates to thixotropic paints which can be prepared in a simple and reliable manner by subsequent thixotropic adjustment of the finished paint.

More specifically, the invention described herein pertains to thixotropic paints containing an additive which is a salt of a reaction product of a polyvalent inorganic acid and an ester having a low epoxide oxygen content. The ester is prepared by reacting (a) An unsaturated aliphatic carboxylic acid of natural origin containing from 8 to 24 carbon atoms with an alcohol selected from the group consisting of monohydric aliphatic alkanols, alkanediols, alkanetriols, alkanetetraols, alkanepentanols, alkanehexanols, polyoxy alkanediols, monohydric cycloalkanols, and aromatic hydrocarbon alcohols; or (b) A fatty alcohol containing from 8 to 24 carbon atoms with alkandioic acids, alkendioic acids, hydroxyalkantrioic acids, benzene dicarboxylic acids, and monocarboxylic alkanoic acids, alkenoic acids of natural origin containing from 8 to 24 carbon atoms.

The herein described thixotropic paints are based on natural or synthetic oils containing a paint additive in an amount of 0.1 to 3%, and preferably 0.25 to 1.5%, by weight on basis of the total paint composition. The additive is a salt of a reaction product, containing a free inorganic acid residue of a polyvalent inorganic acid and an ester. The ester contains from 0.1 to 3%, and preferable from 0.4 to 1%, by weight of epoxide oxygen and is prepared by reacting (a) An unsaturated fatty or wax acid with a saturated alcohol, or (b) An unsaturated fatty alcohol and a mono- or polycarboxylic acid or an unsaturated fatty acid. The polyvalent inorganic acids include sulfuric, phosphoric, and boric acids. The salt of the reaction product may be an alkali metal salt, an ammonium salt, an amine salt, but is preferably a short-chain aliphatic salt. These salts are prepared by neutralizing the reaction product with an organic or an inorganic base, such as ammonia, caustic potash, caustic soda, dimethylamine, triethanolamine, etc.

The epoxidized esters, which contain free inorganic acid residues and which, in the form of their salts with inorganic or organic bases, are used for the production of the thixotropic paints according to the invention, are obtained by the reaction of fatty acid or fatty alcohol esters, which are partially expoxidized and have an epoxide oxygen content of from 0.1 to 3%, with inorganic acids and subsequent neutralization in a known way.

The fatty acid esters of low epoxide content which may be used to prepare esters of group (a) above, are those which are derived from naturally occurring glycerides, the fatty acid fraction of which may be mono- or polyunsaturated, such as soya oil, cottonseed oil, rape oil, linseed oil, castor oil, sunflowerseed oil, olive oil, neat's-foot oil, and also train oils such as herring oil, cod liver oil, shark liver oil or whale oil and their interesterification products. Furthermore, epoxidation products of esters of unsaturated fatty acids with mono- or poly-hydric alcohols of the aliphatic, cycloaliphatic, aromatic or heterocyclic series are suitable. Thus the following are suitable alcohols: alkanols such as ethyl, n-butyl, tert-amyl, 2 ethylhexyl, octadecyl; cycloalkanols such as cyclohexyl, methylcyclohexyl, quercityl, inosityl, cyclopentyl, cycloheptyl; aromatic alcohols such as naphthenyl, benzyl, cresyl, phenylethyl, diphenyl, triphenyl, salicyl; alkanediols such as ethylene glycol, 1, 2-propyleneglycol, butanediol-(1,4), dodecanediol-(1,12), pentamethylene glycol, hexamethlene glycol; alkanetriols such as glycerol; alkanetetraols such as erythritol, pentaerythritol; alkanepentanols such as arabitol; alkanehexanols such as sorbitol; and polyoxyalkyl glycols such as diethylene glycol. Also, epoxidation products of esters of unsaturated carboxylic acids and alcohol mixtures, as well as of mixed esters from polyhydric alcohols and various unsaturated carboxylic acids, for example, the mixed esters from ethyleneglycol with oleic acid and linseed oil fatty acid, can be used.

The esters of low epoxide value useful in preparing esters of group (b) include epoxidized esterification products of unsaturated fatty alcohols and mono- and polycarboxylic acids. Suitable carboxylic acids include: alkanoic acids such as propanoic, pentanoic, decanoic, hexadecanoic, nonadecanoic; alkanedioic acids such as oxalic, succinic, suberic, sebacic, adipic; hydroxyalkantrioic acids such as citric; benzenedicarboxylic acids such as phthalic acids; alkendioic acids such as maleic; and alkenoic acids of natural orign containing from 8–24 carbon atoms.

Starting substances for the preparation of the esters of low epoxide value also include the polycarboxylic acids obtainable by condensation of higher molecular weight unsaturated fatty acids with low molecular weight polybasic carboxylic acids, such as maleic acid, citric acid, adipic acid, and phthalic acid.

The preparation of the epoxidized fatty acid or fatty alcohol esters may be effected in the usual way, preferably by means of per-acid-forming mixtures at temperatures exceeding 30° C., the reaction being carried out until a degree of epoxidation of from 0.1 to 3% is reached, so that the epoxidation products still possess residual iodine values which are in the range of about 20 to 50% of the orignal value.

Inorganic acids suitable for the reaction with the fatty acid or fatty alcohol esters of low epoxide value are first of all sulphuric acid, but, can also be phosphoric acid or boric acid. The reaction of the epoxidized unsaturated esters with, for example, sulphuric acid, is effected in known way and in some cases with concurrent use of inert diluents such as carbon tetra-chloride or sulphur dioxide, depending on the consistency of the reaction mixture in the stirrer vessels or kneaders. The reaction is generally carried out at temperatures of from 10° to 40° C., preferably at 15° to 35° C. The amount of sulphuric acid used depends upon the degree of reaction desired during which the attack on the epoxide group and also on the still present double bond may take place and this can amount to 15 to 40% by weight of concentrated sulphuric acid, based on the amount of epoxidation product used. With respect to the other acids, approximately the same amount will be required. Since the reaction usually is exothermic, it is expedient to ensure removal of the heat, since strong heating of the reaction mixture to a high temperature may lead to side reactions and undesired resinous product. In general, the reaction is regarded as completed after the exothermic reaction has subsided, however, it may be expedient to stir the reaction mixture for a few additional hours.

The reaction products obtained are freed from excess inorganic acid fractions in the usual way as by washing, and are neutralized by addition of inorganic or organic bases, such as sodium or potassium hydroxide, sodium carbonate, ammonia, dimethylamine, and triethanolamine.

In the preparation of thixotropic paints in accordance with the invention, reaction products of epoxidized unsaturated animal, vegetable, or synthetic oils having epoxide oxygen content of 0.1 to 1.5%, with 25 to 35% of sulphuric acid, in the form of their neutral alkali metal, ammonium or amine, and preferably short chain aliphatic amine salts, have proved most suitable. Of these again, the products for the preparation of which epoxidized castor oil with an epoxide oxygen content of 0.4 to 1% is used, and in which the amount of sulphuric acid reacted is 28 to 35% by weight, based on epoxide compound, are also especially suitable. Amount of the additive to be added to attain the desired thixotropic effect is in the range of 0.1 and 3% by weight, and preferably between 0.25 and 1.5% by weight, based on the finished paint. The amount of additive employed will depend on the nature and quantity of the binder, pigment, and solvent used in the paint. It should be apparent that other customary paint additives can also be used.

The practical preparation of the thixotropic paints, that is, the incorporation of the salts in the coatings and pigments, is carried out by simply adding the salt additive to the finished paint and then stirring the mixture. Within a few hours, a stable increase in viscosity develops. It is also possible to grind the ingredients together during the preparation of the pigments, but in regard to the influence on the rheological properties, this offers no special advantages when compared with the subsequent correction of the flow properties by simple addition of the salt additive to the finished paint and then stirring the mixture.

Since the salts used according to the invention are products which, owing to their structure, can interlock in a large variety of ways in the paint structure, in some cases some favorable side effects are attained when the components are ground together rather than blended in the manner already described. Thus, the salts described herein to a certain degree, aid in improving the grinding operation. It has been observed that when the salt additive is ground with the other paint ingredients, an easier and an improved dispersion of the pigment is thereby attained. Furthermore, in certain circumstances, when the incorporation of the salt additive was effected by grinding the paint ingredients, settling of the pigments was further inhibited, although not to a very significant degree. Flooding phenomena can also be counteracted somewhat more effectively by grinding the ingredients together than by the simple admixing and stirring of the finished paint. If the incorporation is carried out during the grinding operation, a period of about 12 hours is necessary to complete and to stabilize the formation of the thixotropic property in the paint.

For developing the thixotropic effect of the salts of the reaction products, active pigments, such as zinc oxide and zinc white or calcium and zinc soaps, are unnecessary although activity is greatly increased by the presence of such products, even in small amounts. By incorporating these active pigments, amount of the salts of the reaction products to be used for the intended purpose can be reduced.

The present invention will be further described by way of illustrations with reference to the following specific examples.

In Examples A to G, various salt additives were prepared. These salt additives were then tested in Examples 1 to 5.

EXAMPLE A

A soya oil, having an acid value 0.1, saponification value 187, and iodine value 120, was reacted in known way with less than the stoichiometric amount of hydrogen peroxide and acetic acid until an epoxide oxygen content of the worked up epoxidation product of 2.6 is attained, the product also having an acid value 0.17 and iodine value 80.5.

The epoxidation product obtained was sulphated with 20% concentrated sulphuric acid at 25 to 28° C. After stirring, it was washed with sodium sulphate solution. The sulphated product obtained as adjusted to a pH value of 6.5 with dimethylamine. The neutralization product was a light colored oil.

EXAMPLE B

A light yellow sperm oil epoxide having an acid value 0.6, saponification value 140, iodine value 51.7, UV 37.2%, and epoxide oxygen content 1.34%, was sulphated with 15% of 96% sulphur acid at 28 to 30° C. The stirring time of the sulphuric acid treatment was about 2 hours, and an additional stirring period of 1½ hours was allowed. The acid ester was stirred into about 80% of the quantity of ammonia required for complete neutralization, ammonia being in the form of a 5% solution. About 55 kg. of 5% ammonia solution per 100 kg. of oil was consumed. The temperature should not exceed 30 to 35° C. While standing for 8 to 10 hours, the water layer containing the salt was separated and the sulphate layer above was completely neutralized with 25% ammonia to a pH value of 6.8 to 7. About 3 to 3.5 kg. of 25% ammonia was used. A brown, clear sulphate was obtained.

EXAMPLE C

An epoxidized glycerine trioleate having an acid value 0.6, iodine value 57.7, and epoxide oxygen 1.4%, was treated at 28 to 30° C. for 1½ to 2 hours with 35% of concentrated sulphuric acid and then subsequently stirred for 1 hour. After washing and separation of the salt water, the acid oil, which had a pH value of about 4.0, was adjusted to a pH value of 6.5 to 7.0 with 40% caustic potash solution. A clear, brownish oil was obtained.

EXAMPLE D

An epoxidized neat's foot oil having an acid value 0.7, iodine value 47.6 and epoxide oxygen value 1.4%, was reacted with 35% of concentrated sulphuric acid for about 2½ hours at 28 to 30° C., and then the charge was stirred for an additional hour. After washing with a 5% ammonia solution and separation of the salt water, the partly neutralized sulphate was completely neutralized with a 40% solution of caustic potash and adjusted to a pH value of about 7.0. A light-brown clear oil was obtained.

EXAMPLE E

A light-yellow, transparent castor oil epoxide, obtained by known epoxidizing process, with the characteristics of acid value 6.0, iodine value 63.7 and epoxide oxygen 0.25%, was sulphonated with 28% of concentrated sulphuric acid at about 30° C. for 1½ hours in a stirred vessel. The mixture was then stirred for another hour. The acid sulphonate was stirred into a 5% solution of ammonia, which contained about 80% of the required amount for complete neutralization. The temperature should not exceed 40° C. during the treatment. The mixture was first allowed to stand at a pH of about 4.5 to 5.0 for 10 to 12 hours at a temperature of 80° C., during which the salt water was separated. After cooling to 25 to 30° C., the acid reaction product was adjusted to pH 6.8–7.0 with ammonia, when the oil became completely clear.

EXAMPLE F

Castor oil epoxide having an acid value of 6.0, iodine value 61.0, and epoxide oxygen 0.7%, was reacted with 33% of concentrated sulphuric acid at 30 to 35° C., and after a reaction time of 2 to 2½ hours followed by additional stirring for about one hour, the acid sulfate was washed and neutralized with caustic soda solution to pH 6.5–7.0. A light, yellow-brown oil was obtained.

EXAMPLE G

An epoxidized light yellow to colorless castor oil having an acid value 0.4, iodine value 66.9 and epoxide oxygen 0.4%, was sulphated with 35% of concentrated sulphuric acid in a vessel with stirring at a temperature of 35° C. for 2 hours. The contents of the vessel were stirred, and allowed to react for additional 1½ hours. The acid sulphonate was added, with cooling, to a dilute, about 16–17% caustic soda solution, and was adjusted to a pH value of 5–5.2. The temperature should not exceed 65 to 70° C. On standing overnight, the salt water separated. The acid sulphonate was finally adjusted to pH 6.5 to 7.0 with caustic soda solution. A light yellow-brown oil was obtained.

In order to be able to evaluate the activity of the above mentioned products A to G in various paints, the pigments were mixed in different amounts with the various products and then were tested by the methods of measurement described below. In one case, a measurement of the thixotropy and in the other, a measurement of the tendency to run, were carried out with the same apparatus by two different methods, namely the wedge method and the comb method.

To measure the tendency to run, the wedge layer testing apparatus DBOM Model 7.3.1 of G. Stierand K. G. (Ritterhude, BRD) was used. This device comprises a combination of two instruments developed in the USA, the so-called Levelling Test Blade, System Stieg and the NPIRI Premix gage. These instruments permit the run-off measurements to be carried out by two different methods.

Measure of the tendency to run by the wedge method

The steel device has two attached surfaces lying in one plane and a pulling edge of 0–300μ cut obliquely. With this, a liquid film 0–300μ in thickness is drawn on to a surface-ground glass plate. After a minute, parallel furrows are made in the wet film at intervals with a concave pen causing 60μ increase in thickness of the layer in each case, and after another minute, the plate is set up vertically. After a standing time of at least 30 minutes, the run-off is estimated. In this case, the thickness in layer of the furrow in μ which no longer runs off is given as the standard.

Measurement of the tendency to run by the comb method

In this case, the rear of the same device is used. It consists of two indentations of increasing depth lying close together at a distance of about 2 mm. and with the following graduations: 0.25, 0.5, 1.0, 2.0 and 4.0 mm. After the paint is drawn onto the ground glass plates in ribs, the plate is set up vertically after 2 minutes and the run-off is estimated after the lapse of at least half an hour. In this way, it can be distinguished which pair of ribs have run and which pair of ribs have not run together into one another.

To measure the thixotropy, a simple method was used which when compared with the considerable time needed for the conventional methods, is rapid and yet makes it possible to draw conclusions for practical purposes. An Epprecht rotary viscosimeter, Model Rheomat 15, with 15 speeds, of the firm of Contraves, Zurich, was used as the measuring apparatus. The corresponding measuring cup with a spindle was filled with the material to be investigated and, after removal of air bubbles in vacuo, was left to stand for at least half an hour. Then, the optimum deflection of the indicator was read off at the lowest possible speed. This optimum was generally attained after 5 to 10 seconds. The value calculated from the reading can be taken as a measure of the thixotropy attained.

Immediately after this first reading, the device was adjusted to the highest possible speed, which was chosen so that after a period of 30 seconds, a reading on the scale was still just possible. The difference between the value so found and that from the first reading makes it possible to ascertain at once whether thixotropy was present at all and secondly, to detect the tendency of breaking-up of thixotropy.

After the second reading was taken, the appliance was re-set to the speed first used, and after a period of 30 seconds, the apparent viscosity was read off. The difference between the last and the first values may be considered as a measure of the thixotropic retrogression.

From the values so found, important conclusions on the commercial properties of the tested paints can be drawn. The measured value 1 gives the viscosity or thixotropy after the preparation or during storage. The tendency of the pigments to settle decreases with increasing values. The flow characteristics of the tested paints can be determined from the difference of measured value 1 and measured value 2, the thixotropic break-up. A high difference in value indicates a good flow of the color in the paint since it points to a ready break-up of the thixotropy by the brushwork.

The measured value 3 or the difference between 1 and 3 indicates the thixotropic retrogression. This value is decisive for the run-off properties and in some circumstances for a reduction of the tendency to flooding and floating. The smaller the difference between 1 and 3, the more rapidly the thixotropy recovers and the lesser is the tendency to run-off and flood of the tested pigment.

EXAMPLE 1

The following blue building paint, for interior and exterior use, was used to carry out the experiments:

|   | Parts by weight |
|---|---|
| Alkyl resin with 60% of cottonseed oil in 60% solution in turpentine substitute | 625 |
| Titanium dioxide, rutile type | 250 |
| Heavy spar | 50 |
| Phthalocyanine Blue | 4 |
| Calcium siccative with 4% calcium | 3.5 |
| Dipentene | 14.0 |
| Decalin | 20.0 |
| Settling-preventing agent | 2.0 |
| Cobalt siccative with 6% Co | 4.2 |
| Lead siccative with 24% Pb | 2.8 |
| Zinc siccative with 8% zinc | 2.7 |
| Methylethylketoxime | 2.0 |
| Turpentine substitute | 19.8 |

The paint was adjusted with turpentine substitute to a viscosity of 110 at 20° C. outflow time in seconds from a standardized conical beaker with a total height of 68 mm., a content of 100 ml., and an outflow aperture of 4 mm. diameter (specification of the German Industry Standards DIN 53,211). The density was 1.18 at 20° C. and the pigment-volume concentration about 17.8%. The paint showed good flow characteristics, a greater tendency to run-off a vertical surface with a thicker coat, and moderate floating phenomena.

The products to be used in accordance with the invention, were incorporated in different quantities in this finished paint by simple addition and stirring. The values of the various measurements are as given in the following table. When 0.5 to 1% by weight of the products C to G, especially F and G, was added to the experimental paint, a complete elimination of the run-off and flooding tendency was attained while retaining good flow characteristics.

| Additive added, wt. percent | Apparent viscosity in cp., at 20° C. and at speed setting 2 | 10 | Wedge method, no run-off at 2 | Comb method, no run-off at mm |
|---|---|---|---|---|
| 0.0 | 512 | 494 | 498 | 60 | 0.25—flows. |
| 0.25 G | 625 | 552 | 605 | 60 | Do. |
| 0.5 G | 759 | 556 | 730 | 120 | 0.5—flows. |
| 1.0 G | 1,130 | 750 | 1,012 | 120 | Do. |
| 1.5 G | 1,340 | 790 | 1,130 | 180 | 1.0—flows. |
| 0.25 F | 630 | 560 | 600 | 60 | 0.25—flows. |
| 0.5 F | 750 | 565 | 725 | 120 | 0.5—flows. |
| 1.0 F | 1,140 | 750 | 1,010 | 120 | Do. |
| 1.5 F | 1,350 | 790 | 1,135 | 180 | 1.0—flows. |
| 0.25 E | 615 | 540 | 585 | 60 | 0.25—flows. |
| 0.5 E | 740 | 550 | 702 | 120 | 0.5—flows. |
| 1.0 E | 1,125 | 730 | 1,000 | 120 | Do. |
| 1.5 E | 1,330 | 775 | 1,100 | 180 | 1.0—flows. |
| 0.25 D | 630 | 540 | 590 | 60 | 0.25—flows. |
| 0.5 D | 765 | 570 | 715 | 120 | 0.5—flows. |
| 1.0 D | 1,140 | 745 | 1,000 | 120 | Do. |
| 1.5 D | 1,345 | 780 | 1,100 | 180 | 1.0—flows. |
| 0.25 C | 625 | 540 | 580 | 60 | 0.25—flows. |
| 0.5 C | 760 | 565 | 695 | 120 | 0.5—flows. |
| 1.0 C | 1,130 | 750 | 980 | 120 | Do. |
| 1.5 C | 1,350 | 780 | 1,095 | 180 | 1.0—flows. |
| 0.25 B | 540 | 505 | 520 | 60 | 0.25—flows. |
| 0.5 B | 680 | 530 | 600 | 60 | Do. |
| 1.0 B | 1,015 | 610 | 675 | 120 | Do. |
| 1.5 B | 1,250 | 800 | 950 | 120 | 0.5—flows. |
| 0.25 A | 600 | 520 | 560 | 60 | 0.25—flows. |
| 0.5 A | 730 | 550 | 640 | 60 | Do. |
| 1.0 A | 1,040 | 645 | 790 | 120 | 0.5—flows. |
| 1.5 A | 1,310 | 795 | 1,040 | 120 | Do. |

EXAMPLE 2

A white paint for interior and exterior application, of the following composition was used:

|   | Parts by weight |
|---|---|
| Alkyd resin with 67% of tall oil/linseed oil in 70% solution in turpentine substitute | 400 |
| Alkyd resin with 60% of ricinene oil in 70% solution in turpentine substitute | 170 |
| Titanium dioxide, rutile type | 271 |
| Dipentene | 15 |
| Decalin | 20 |
| Cobalt siccative 6% Co | 2 |
| Lead siccative 24% Pb | 6 |
| Methylethylketoxime | 3 |
| Turpentine substitute | 113 |

Further, in order to demonstrate the influence of the presence of zinc oxide, a similar paint was made in which, however, 20 parts by weight of the titanium dioxide were replaced by 20 parts by weight of zinc oxide. In both paints, 0.5 to 1.5% by weight of the product F was stirred in and the tests shown in the table below were carried out on the paints so obtained.

| Additive added, wt. percent | Wedge method, no run-off at μ | | Comb method, no run-off at mm. | |
|---|---|---|---|---|
|   | Without ZnO | With 2% ZnO | Without ZnO | With 2% ZnO |
| 0.0 | 60 | 60 | 0.25—flows | 0.25—flows. |
| 0.5 F | 60 | 120 | do | Do. |
| 0.75 F | 60 | 120 | do | 0.5—flows. |
| 1.0 F | 120 | 180 | 0.5—flows | 1.0—flows. |
| 1.5 F | 180 | 240 | do | Do. |

EXAMPLE 3

For the test experiments of this example, a paint of the following composition was used:

|   | Parts by weight |
|---|---|
| Resin-modified alkyd resin with 50% of wood oil/, tall oil in a 60% solution in turpentine substitute | 160 |
| Alkyd resin with 65% of linseed oil in a 60% solution in turpentine substitute | 67 |
| Titanium dioxide, anatase type | 120 |
| Calcium carbonate | 380 |
| Heavy spar | 140 |
| Dipentene | 20 |
| Decalin | 50 |
| Cobalt siccative, 6% Co | 0.8 |
| Lead siccative, 24% Pb | 1.6 |
| Mixture of methylethylketoxime and o-benzylphenol | 2.0 |
| Turpentine substitute | 58.6 |

The density of the paint was 1.61 at 20° C.; the viscosity was 125 at 20° C. outflow time in seconds from a standardized conical beaker with a total height of 68 mm., a content of 100 ml., and an outflow aperture of 4 mm. diameter (specification of the German Industry Standards DIN 53,211) at 20° C. The pigment volume concentration was about 61.9%.

The paint was mixed with different quantities of Product G by simple stirring which then gave the results shown in the following table for the various experiments.

| Additive added, wt. percent | Apparent viscosity in cp., at 20° C. and at speed setting 1 | 7 | 1 | Wedge method, no run-off at μ | Comb method, no run-off at mm. |
|---|---|---|---|---|---|
| 0 | 625 | 600 | 610 | 60 | 0.25—flows. |
| 0.25 G | 2,740 | 1,075 | 1,600 | 120 | 0.5—flows. |
| 0.5 G | 4,250 | 1,800 | 3,760 | 300 | 4.0—flows. 2.0—does not flow. |
| 0.75 G | 5,450 | 1,880 | 4,780 | >300 | 4.0—flows. 1.0—does not flow. |
| 1.0 G | 6,920 | 2,040 | 5,320 | >300 | 4.0—flows. 2.0—does not flow. |

EXAMPLE 4

A yellow consumption coating, which is put on as a one-layer coating, having the following composition, was used:

| | Parts by weight |
|---|---|
| Resin-modified alkyd resin with 50% of wood oil/ tall oil in a 60% solution in turpentine substitute | 98 |
| Alkyd resin with 65% linseed oil in a 60% solution in turpentine substitute | 175 |
| Alkyd resin with 60% ricinene oil in a 70% solution in turpentine substitute | 126 |
| Titanium dioxide, rutile type | 112 |
| Heavy spar | 141 |
| Zinc yellow | 141 |
| Decalin | 28 |
| Cobalt siccative, 6% Co | 0.6 |
| Lead siccative, 24% Pb | 1.0 |
| Methylethylketoxime | 1.4 |
| Turpentine substitute | 176 |

The pigment-volume concentration of the coating was about 30.4%.

The incorporation of the Product F was in this case carried out in a second batch of absolutely equal composition during the production of the pigment paste. On storage of the two pigments, the batch made without the Product F showed a hard sediment even after 3 days, while the pain with Product F had no sediment after 6 months. The measured values obtained with the two coatings are shown in the following table.

| Additive added, wt. percent | Apparent viscosity in cp., at 20° C. and at speed setting | | | Wedge method, no run-off at $\mu$ | Comb method, no run-off at mm. |
|---|---|---|---|---|---|
| | 2 | 8 | 2 | | |
| Without | 506 | 470 | 490 | 60 | 0.2—flows. |
| 0.5 F | 1,560 | 1,110 | 1,420 | 300 | 2.0—flows. |

EXAMPLE 5

A primer coating of the following composition was used in this experiment:

| | Parts by weight |
|---|---|
| Resin-modified alkyd resin with 38% of wood oil/ tall oil in a 60% solution in xylene | 325 |
| Zinc yellow | 45 |
| Microtalcum | 57.8 |
| Titanium dioxide, anatase type | 105 |
| Lithopone with 30% of ZnS | 231 |
| Fire black | 4.2 |
| Ethyl glycol | 21 |
| Decalin | 21 |
| Cobalt siccative, 6% Co | 1.3 |
| Lead siccative, 24% Pb | 4.8 |
| Manganese siccative, 6% Mn | 1.3 |
| Methylethylketoxime | 2.0 |
| Xylene | 180.6 |

The primer coating had a pigment-volume concentration of approximately 40%. In this case, during the production of the pigment paste, the incorporation of the Product G was carried out in a second batch of exactly equal composition. The primer made according to the abovementioned batch without an addition of Product G had a viscosity of 120 at 20° C. outflow time in seconds from a standardized conical beaker with a total height of 68 mm., a content of 100 ml., and an outflow of 4 mm. diameter (specification of the German Industry Standards DIN 53,211).

The various measurements, the results of which are shown in the following table, were carried out with and without addition of Product G to the primer. On application of the paint, it was found that the tendency to flooding present in the coating without an additive was completely eliminated by the incorporation of the Product G. Product G was incorporated by grinding with the pigments. It was discovered that this procedure substantially facilitated the grinding operation.

| Additive added, wt. percent | Apparent viscosity in cp., at 20° C and at speed setting | | | Wedge method, no run-off at $\mu$ | Comb method, no run-off at mm. |
|---|---|---|---|---|---|
| | 2 | 10 | 2 | | |
| Without | 536 | 505 | 525 | 60 | 0.5—flows. |
| 0.5 G | 990 | 520 | 780 | 300 | 2.0—flows. |

The advantage obtainable by the herein described process for the production of thixotropic paints resides in that by simple mixing and stirring of the additive into the paint which has already been adjusted to a brushing consistency, a satisfactory thixotropic effect can be attained. This presents an opportunity for correction of the thixotropic character of paints which have been made for application. Furthermore, in most cases, it is possible to eliminate lesser tendencies to settling and flooding by incorporation of the additive by simple mixing and stirring. In more acute cases, the last-named drawbacks can be removed by an incorporation of the additive during the grinding of the pigments, which will also facilitate the grinding operation.

It should be understood that no claim is proffered for the esters of unsaturated carboxylic fatty acids and saturated alcohols or esters of unsaturated fatty alcohols and carboxylic acids. These esters, as well as acids and alcohols from which they may be prepared, are compounds which are well known in the chemical arts. The subject matter which is believed to be novel and to which the appended claims relate is a paint additive in the form of a salt of a reaction product of a polyvalent inorganic acid and an ester, and a process for preparation of thixotropic paints by incorporating the novel paint additive in an oil-based paint.

Various modifications can be made in the herein described additive and process for its utilization without departing from the spirit or the scope of the invention. It is to be understood that the invention is to be limited only as defined by the appended claims.

We claim:

1. An oil-modified alkyd resin thixotropic paint containing from 0.1 to 3% by weight, based on the finished paint, of an additive which is a salt selected from the group consisting of alkali metal, ammonium and lower aliphatic amine salts of a reaction product of a polyvalent inorganic acid selected from the group consisting of sulfuric acid, phosphoric acid and boric acid and an ester selected from the group consisting of (a) an ester having an epoxide content of from 0.1 to 3% by weight of unsaturated aliphatic carboxylic acid of natural origin having from 8 to 24 carbon atoms and an alcohol selected from the group consisting of monohydric aliphatic alkanols alkanediols, alkanetriols, alkanetetraols, alkanepentanols, alkanehexanols, polyoxyalkanediols, monohydric cycloalkanols, and aromatic hydrocarbon alcohols; and (b) an ester having an expoxide content of from 0.1 to 3% by weight of an unsaturated fatty alcohol having from 8 to 24 carbon atoms and a carboxylic acid selected from the group consisting of monocarboxylic alkanoic acids, alkandioic acids, alkendioic acids, hydroxyalkantrioic acids, benzene dicarboxylic acids, and alkenoic acids of natural origin having from 8 to 24 carbon atoms; and (c) a mixture of (a) and (b), the amount of said inorganic acid being from 15% to 40% by weight of said ester, said ester having a residual unsaturation, measured in terms of its iodine value of from 20 to 50% of its original value before epoxidation.

2. Paint of claim 1 wherein said acid is sulfuric acid which is used in an amount of 25 to 35% by weight based on said ester.

3. Paint of claim 1 wherein the amount of said additive in said paint is from 0.25 to 1.5% by weight, based on the finished paint.

4. Paint of claim 1 where said esters are derived from an unsaturated natural fat or oil.

5. Paint of claim 4 wherein said unsaturated oil is selected from the group consisting of soya oil, cottonseed oil, rape oil, linseed oil, castor oil, sunflowerseed oil, olive oil, neat's-foot oil, and also train oils selected from herring oil, cod liver oil, shark liver oil, whale oil and their interesterification products.

6. Paint of claim 4 wherein said unsaturated natural oil is castor oil having an epoxide oxygen content of 0.4 to 1% by weight.

7. Process for preparation of oil-modified alkyd resin thixotropic paint comprising admixing from 0.1 to 3% by weight, based on the finished paint, of an additive with an oil-modified alkyd resin paint, said additive being a salt selected from the group consisting of alkali metal, ammonium and lower aliphatic amine salts of a reaction product of a polyvalent inorganic acid selected from the group consisting of sulfuric acid, phosphoric acid and boric acid and an ester selected from the group consisting of (a) an ester having an epoxide content of from 0.1 to 3% by weight of unsaturated aliphatic carboxylic acid of natural origin having from 8 to 24 carbon atoms and an alcohol selected from the group consisting of monohydric aliphatic alkanols, alkanediols, alkanetriols, alkanetetraols, alkanepentanols, alkanehexanols, polyoxyalkanediols, monohydric cycloalkanols, and aromatic hydrocarbon alcohols; and (b) an ester having an epoxide content of from 0.1 to 3% by weight of an unsaturated fatty alcohol having from 8 to 24 carbon atoms and a carboxylic acid selected from the group consisting of monocarboxylic alkanoic acids, alkandioic acids, alkendioic, acids, hydroxyalkantrioic acids, benzene dicarboxylic acids, and alkenoic acids of natural origin having from 8 to 24 carbon atoms; and (c) a mixture of (a) and (b), the amount of said inorganic acid being from 15% to 40% by weight of said ester, said ester having a residual unsaturation, measured in terms of its iodine value of from 20 to 50% of its original value before epoxidation.

8. Process of claim 7 wherein said acid is sulfuric acid which is used in an amount of 25 to 35% by weight based on said ester.

9. Process of claim 7 wherein the amount of said additive in said paint is from 0.25 to 1.5% by weight, based on the finished paint.

10. Process of claim 7 wherein said esters are derived from an unsaturated natural fat or oil.

11. Process of claim 10 wherein said unsaturated oil is selected from the group consisting of soya oil, cottonseed oil, rape oil, linsed oil, castor oil, sunflowerseed oil, olive oil, neat's-foot oil, herring oil, cod liver oil, shark liver oil, whale oil and their interesterification products.

12. Process of claim 10 wherein said unsaturated natural oil is castor oil having an epoxide oxygen content of 0.4 to 1% by weight.

13. Process of claim 7 wherein said step of admixing said additive is carried out by grinding said additive and the conventional pigments together.

References Cited

UNITED STATES PATENTS

| | | | |
|---|---|---|---|
| 1,159,257 | 11/1915 | Nuth | 260—402.5 |
| 2,384,491 | 9/1945 | Posnansky | 260—402.5 |
| 2,485,160 | 10/1949 | Niederhauser et al. | 260—348 |
| 3,006,936 | 10/1961 | Findley et al. | 260—406 |
| 3,035,069 | 5/1962 | Findley et al. | 260—398 |
| 3,098,052 | 7/1963 | Schmitz et al. | 260—22 |
| 3,251,704 | 5/1966 | Nellessen | 260—22 |
| 3,302,410 | 2/1967 | McLean | 260—22 |
| 3,412,053 | 11/1968 | Pugliese | 260—40 |

FOREIGN PATENTS

| | | | |
|---|---|---|---|
| 1,013,367 | 12/1965 | Great Britain | 260—22 |

DONALD E. CZAJA, Primary Examiner

R. W. GRIFFIN, Assistant Examiner

U.S. Cl. X.R.

117—124; 161, 168; 260—30.6, 30.8, 32.2, 32.4, 32.6, 33.6, 40